June 6, 1944. W. E. BENN 2,350,868
BRAKE
Filed Aug. 2, 1941 2 Sheets-Sheet 1

INVENTOR.
WALTER E. BENN
BY

June 6, 1944. W. E. BENN 2,350,868
BRAKE
Filed Aug. 2, 1941 2 Sheets-Sheet 2
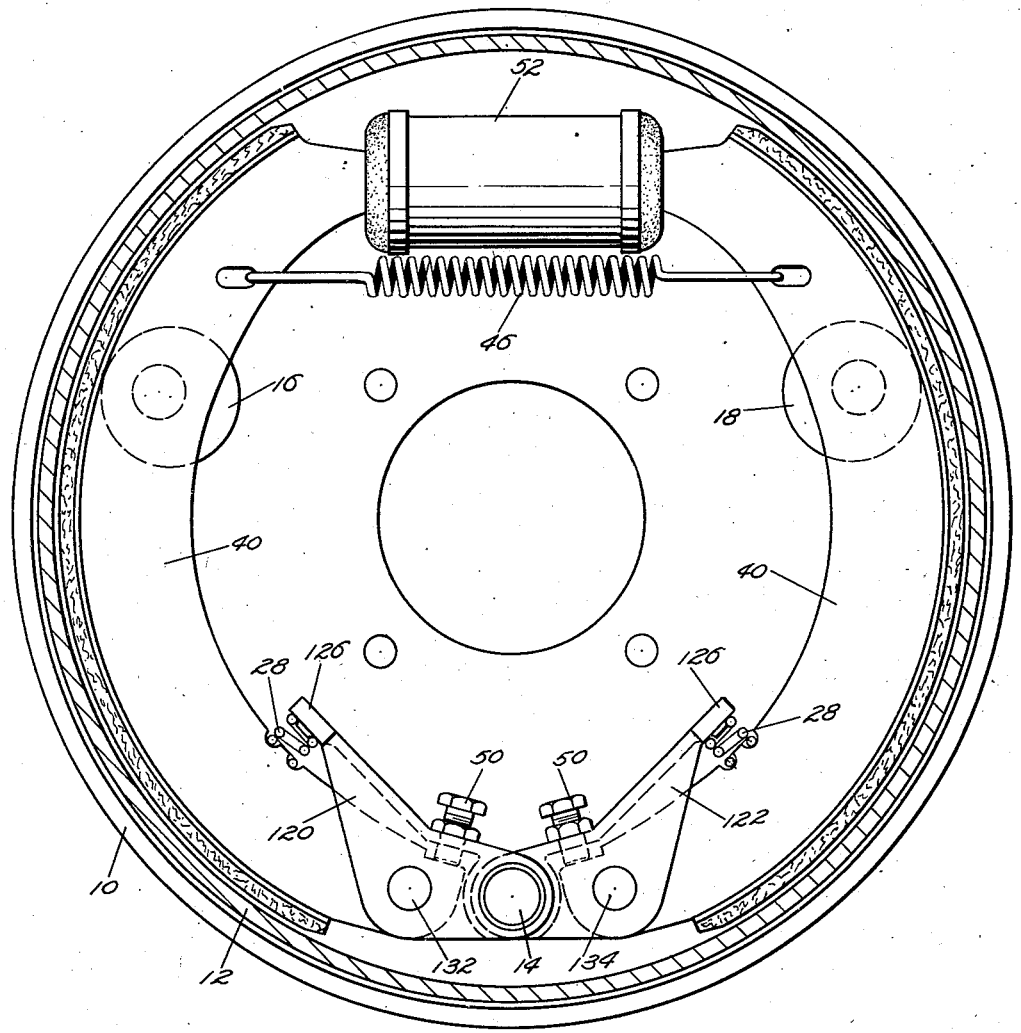
INVENTOR.
WALTER E. BENN Patented June 6, 1944

2,350,868

UNITED STATES PATENT OFFICE 2,350,868

BRAKE

Walter E. Benn, Detroit, Mich., assignor to Hydraulic Brake Company, Detroit, Mich., a corporation of California Application August 2, 1941, Serial No. 405,236

11 Claims. (Cl. 188—78)

This invention relates to brakes, and more particularly to internal expanding brakes for motor vehicles.

Broadly the invention comprehends a brake structure including a fixed support or backing plate, a rotatable drum associated therewith, a pair of levers pivoted on the backing plate having pivot pins mounted intermediate their ends, a pair of friction elements or shoes mounted on the pivot pins, a pair of compression springs interposed between the free ends of the levers and the friction elements, and a motor for actuating the shoes.

An object of the invention is to provide an internal expanding brake including a pair of friction elements pivotally connected to a pair of pivotable levers.

Another object of the invention is to provide a brake of the internal expanding type including a pair of friction elements so connected to a pair of levers as to be movable therewith and pivot thereon.

A further object of the invention is to provide a brake including a pair of friction elements so connected to a pair of pivoted levers whereby the initial applied force on the friction elements results in actuating the friction elements and levers as a unit, and as the applied force is increased the friction elements pivot on the levers relative thereto.

Other objects and advantages of the invention will appear from the following description taken in connection with the accompanying drawings forming a part of this specification, and in which—

Fig. 3 is a vertical sectional view of a brake illustrating a modification of the invention.

Figure 1:
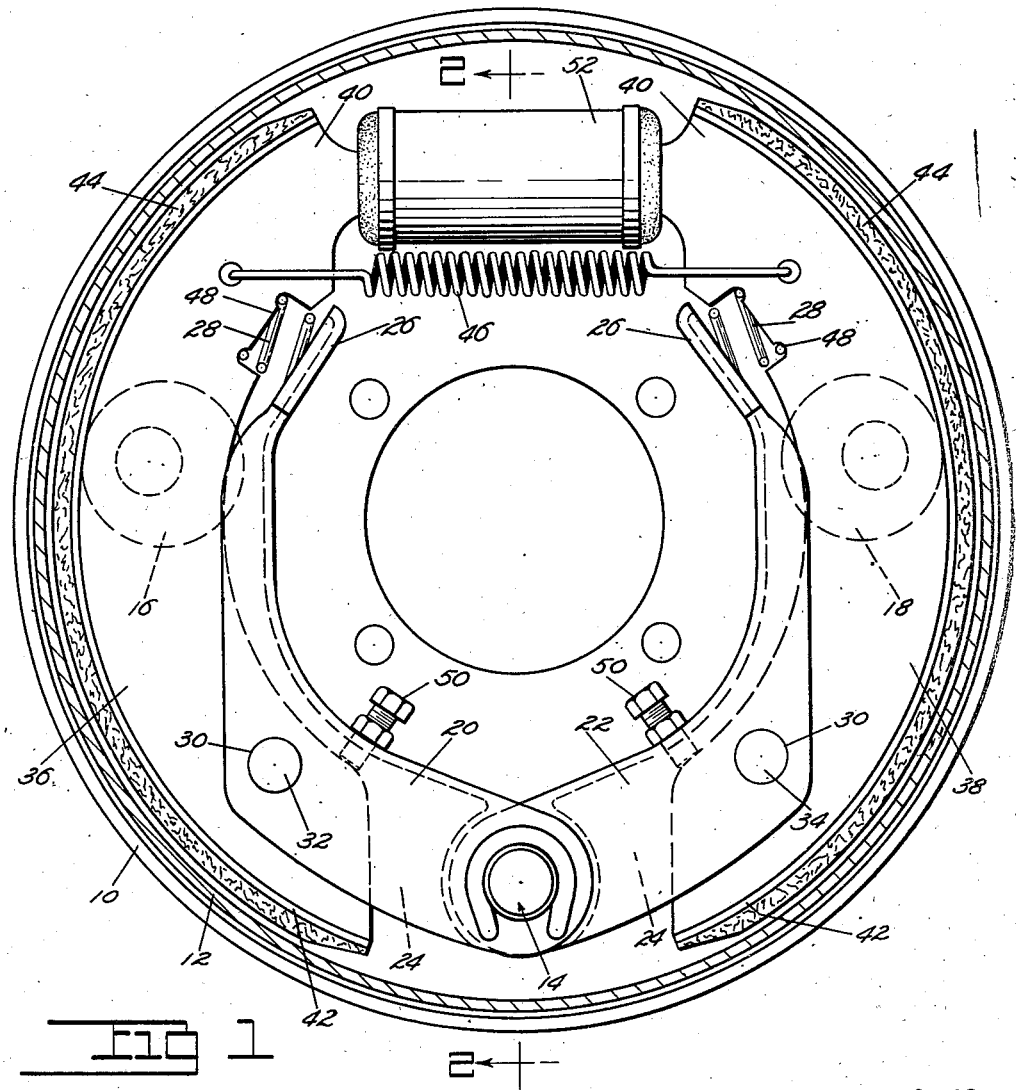
Fig. 1 is a vertical sectional view of a brake illustrating a preferred embodiment of the invention.
Figure 2:
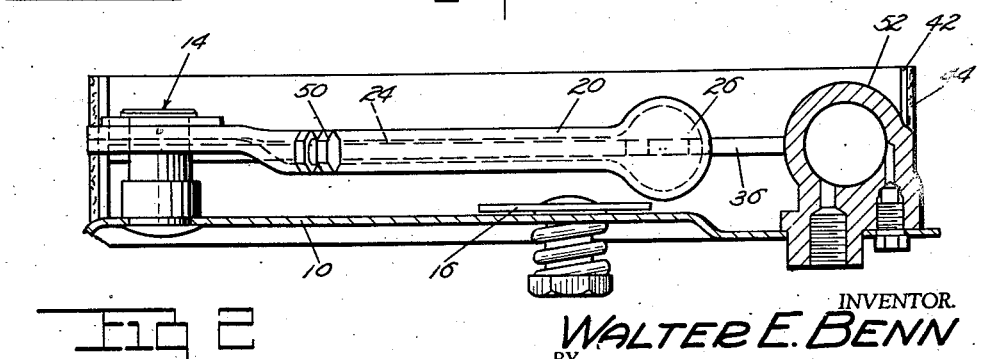
Fig. 2 is a sectional view substantially on line 2—2 of Fig. 1.

Referring to the drawings for more specific details of the invention, the brake includes a fixed support or backing plate 10, adapted to be secured to an axle or axle housing, and a rotatable drum 12 associated with the backing plate and adapted to be secured to a wheel. Suitably arranged on the backing plate is an anchor indicated generally at 14, and a pair of adjustable retractile stops 16 and 18.

A pair of levers 20 and 22 are pivotally mounted on the anchor 14. As shown, the levers are constructed to provide yokes 24 so that the axes of the respective levers may be in the same plane. The free ends 26 of the levers are circular in construction for the reception of compression springs 28, the purpose of which will hereinafter appear. Intermediate the ends of the levers through the yokes thereof are bores 30, and pivot pins 32 and 34 suitably mounted in the yokes are received by the bores.

A pair of corresponding interchangeable friction elements or shoes 36 and 38 are mounted on the backing plate for cooperation with the drum. Each of the shoes includes a web 40 supporting a rim 42 having suitably secured thereon a friction lining 44.

The articulate ends of the shoes are mounted on the pivot pins 32 and 34. The shoes 36 and 38 are connected by a retractile spring 46 which serves to hold the shoes against the retractile stops 16 and 18 and to return the shoes to their retracted position upon conclusion of a braking operation.

The compression springs 28 are interposed between the adjacent ends of the levers and adjacent the force-applying ends of the shoes 36 and 38 and are received in slotted sections 48 in the web of the shoes. Threaded in the levers 20 and 22 are adjustment screws 50 for maintaining proper spaced relationship between the levers and the friction elements.

A fluid pressure actuated motor 52 of conventional type is suitably mounted on the backing plate and connected to the force-applying ends of the shoes 36 and 38, and the motor is operative to actuate the shoes into engagement with the drum against the resistance of the retractile spring 46.

In a normal braking operation, upon energization of the motor 52 the shoes 36 and 38 are moved into engagement with the drum against the resistance of the retractile spring 46 to effectively retard rotation of the drum.

As the braking force requires, and the motor 52 is further energized, the force of the compression springs 28 is overcome with a resultant pivoting of the shoes on the pivot pins and consequent relative movement between the shoes and the levers. This action is effective to more equally distribute the braking force throughout the lining of the shoes when greater than normal braking force is applied to the shoes with a subsequent desirable wear pattern of the lining.

In the modification of the invention illustrated in Fig. 3, the only variation from the preferred embodiment is the introduction of levers 120 and 122 corresponding to levers 20 and 22 being of shorter length. Consequently with the reduction in length of the levers, pivot pins 132 and 134 corresponding to pivot pins 32 and 34 are located in closer proximity to the anchor. Correspondingly, free ends 126 of the levers are adjacent the articulate ends of the shoes rather than adjacent the force-applying ends of the shoes, as is shown in the preferred embodiment of the invention.

The operation of the brake illustrated in the modification is identical to that of the preferred form of the invention. The only difference resides in that the shoe pivots at a lesser radius with respect to the anchor 14, as compared with the preferred embodiment, as relative movement occurs between the shoe and lever because of the location of the pivot pins 132 and 134 closer to the anchor than the pivot pins 32 and 34.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A brake comprising a fixed support, a rotatable drum associated therewith, a pair of friction elements for cooperation with the drum, an anchor on the support, a pair of levers pivotally mounted on the anchor, means connecting the levers to the friction elements, means directly applying an actuating force to the friction elements, compression springs interposed between the levers and the actuated ends of the elements, and means intermediate the lever-element connection and the lever anchor for setting the retracted relative position of the levers and elements.

2. A brake comprising a fixed support, a rotatable drum associated therewith, a pair of friction elements for cooperation with the drum, an anchor on the support, levers pivotal on the anchor, means connecting the friction elements to the levers intermediate the lever ends, means consisting of compression springs and set-screws for normally holding the friction elements and levers as a rigid element, said springs being positioned the length of the friction elements from the lever-friction element connections, and means for applying actuating force directly to the friction elements, the set-screws inhibiting relative movement of the levers and elements in one direction and the spring resisting relative movement in the other direction.

3. A brake comprising a fixed support, a rotatable drum associated therewith, a pair of levers pivoted on the support, a pair of friction elements connected to the levers for cooperation with the drum, means for applying actuating force directly to the friction elements, and means on the levers and friction elements cooperating to resist relative movement of the levers and friction elements in one direction and to inhibit relative movement in the other direction, said resisting means being adjacent the force applied ends of the friction elements.

4. A brake comprising a fixed support, a rotatable drum associated therewith, a pair of levers pivoted on the support, a pair of friction elements having articulate ends pivotally connected to the levers, means for applying actuating force directly to the friction elements, and means adjacent the actuated ends of the friction elements normally holding the levers and friction elements as a rigid unit.

5. A brake comprising a fixed support, a rotatable drum associated therewith, a pair of levers fulcrumed on the support, a pair of friction elements pivotally mounted on the levers intermediate the anchored and free ends thereof, means for applying actuating force directly to the free ends of the friction elements, and resilient means interposed between the free ends of the levers and the actuated ends of the elements.

6. A brake comprising a fixed support, a rotatable drum associated therewith, a pair of levers having one end fulcrumed on the fixed support, a pair of friction elements pivotally mounted on the levers between their anchored and free ends, compression springs between the levers and friction elements adjacent the articulate ends of the friction elements, means fixing the relative retracted position of the friction elements and levers whereby the retracted relative distance between the free ends of the levers and elements is a maximum during any phase of relative movement of the levers and elements, and means for applying actuating force to the free ends of the friction elements, said compression springs being located adjacent the force applied ends of the friction elements.

7. A brake comprising a fixed support, a rotatable drum associated therewith, an anchor on the support, a pair of levers fulcrumed thereon, a pair of friction elements pivotally mounted at their articulate ends on the levers, compression springs between the free ends of the levers and the friction elements adjacent the force applying ends theerof, and means for directly and positively actuating the free ends of the friction elements.

8. A brake comprising a fixed support, a rotatable drum associated therewith, an anchor on the support, a pair of levers fulcrumed on the anchor, a pair of friction elements pivotally mounted on the levers, means for directly and positively actuating the friction elements, means retaining the levers and friction elements for concomitant movement during initial actuation and relative movement thereafter, and means adjacent the applied ends of the friction elements resisting relative movement of the levers and friction elements in one direction.

9. A brake comprising a fixed support, a rotatable drum, a pair of friction elements cooperating with the drum, actuating means for directly applying force to the elements, a pair of levers pivoted on the support having a part intermediate their ends coupled to the articulate ends of the elements, compression springs between the free ends of the levers and the free ends of the elements, and adjusting means on the levers for maintaining the friction elements in proper spaced relationship with the levers and drum when in retracted position.

10. A brake comprising a fixed support, a rotatable drum, a pair of levers pivotally anchored on the support, a pair of friction elements pivotally mounted on the levers intermediate their ends, compression springs between the free ends of the levers and the free ends of elements, adjusting means on the lever between the anchor for the levers and the pivot position of the friction elements on the levers resisting the compression force of the springs and for maintaining proper spaced relationship of the elements and drum when in retracted position, and means for applying actuating force directly to the friction elements.

11. A brake comprising a fixed support, a rotatable drum associated therewith, a pair of friction elements for cooperation with the drum, a pair of levers pivoted on the support, pivot pins coupling the articulate ends of the respective elements to the respective levers intermediate the length of the levers, springs between the free ends of the levers and the friction elements, set screws on the levers inhibiting the relative movement in one direction between the levers and elements, said springs and set screws cooperating to normally resist relative movement between the elements and levers, and a fluid pressure motor positioned between the force-applying ends of the elements for positive actuation of the elements.

WALTER E. BENN.